United States Patent [19]

Fisher et al.

[11] 4,126,990
[45] Nov. 28, 1978

[54] CUTTER DISC ASSEMBLY FOR ROTARY LAWN MOWER

[75] Inventors: Gerald C. Fisher; Joseph E. Scanland, both of Savannah, Ga.

[73] Assignee: Roper Corporation, Kankakee, Ill.

[21] Appl. No.: 714,982

[22] Filed: Aug. 18, 1976

[51] Int. Cl.² .............................................. A01D 55/18
[52] U.S. Cl. ........................................ 56/295; 56/12.7
[58] Field of Search ...................... 56/295, 17.5, 12.7, 56/255, 295; 172/15

[56] References Cited

U.S. PATENT DOCUMENTS

| | | | |
|---|---|---|---|
| 2,888,993 | 6/1959 | Dunning | 172/15 |
| 3,014,333 | 12/1961 | Clark, Jr. | 56/295 |
| 3,018,602 | 1/1962 | Diesterweg | 56/295 |
| 3,104,510 | 9/1963 | Voigt | 56/295 |
| 3,167,899 | 2/1965 | Best | 56/295 |
| 3,176,455 | 4/1965 | Buchanan | 56/295 |
| 3,208,209 | 9/1965 | Dunlap et al. | 56/295 |
| 3,474,608 | 10/1969 | Frick | 56/295 |
| 3,684,027 | 8/1972 | Crawford | 172/15 |
| 3,831,278 | 8/1974 | Voglesonger | 56/295 X |
| 3,900,071 | 8/1975 | Crawford | 172/15 |
| 4,054,992 | 10/1977 | Ballas et al. | 30/276 |

FOREIGN PATENT DOCUMENTS

| | | | |
|---|---|---|---|
| 1,657,039 | 10/1970 | Fed. Rep. of Germany | 56/295 |
| 1,058,467 | 3/1954 | France | 56/295 |

Primary Examiner—Russell R. Kinsey
Attorney, Agent, or Firm—Richard L. Voit; C. Frederick Leydig; David J. Richter

[57] ABSTRACT

A cutter disc assembly for a rotary lawn mower in which the disc has a circular central portion and a peripheral portion with a shallow vertical wall in between. Radial openings are provided in the wall in register with radial grooves formed in the underside of the peripheral portion. A plastic pin is in register with each opening, with the shank of the pin occupying the associated groove and with a stiffly resilient tip portion projecting beyond the periphery of the disc into cutting engagement with the grass. Each groove has a curved rear wall against which the pin bends as the projecting tip of the pin strikes an obstruction as well as a curved front wall against which the pin bends upon rebound, the curved walls being of outwardly flaring shape thereby to support the shank of the pin substantially free of concentrated stress. Each groove has, in addition, a bridge or "ceiling" which serves as a guide surface to hold the pin in a downwardly-angled working position and to provide frictional damping. Protection of tip portion of the pin in its bent state is offered by a ledge or radial extension on the disc either above or below the pin and which "wipes by" the obstruction, shielding the pin from abrading action. Upwardly swept radial vanes are provided above the periphery of the disc to generate air currents which agitate the grass as it is being cut and to provide a stream of air to move the clippings through the discharge chute.

29 Claims, 27 Drawing Figures

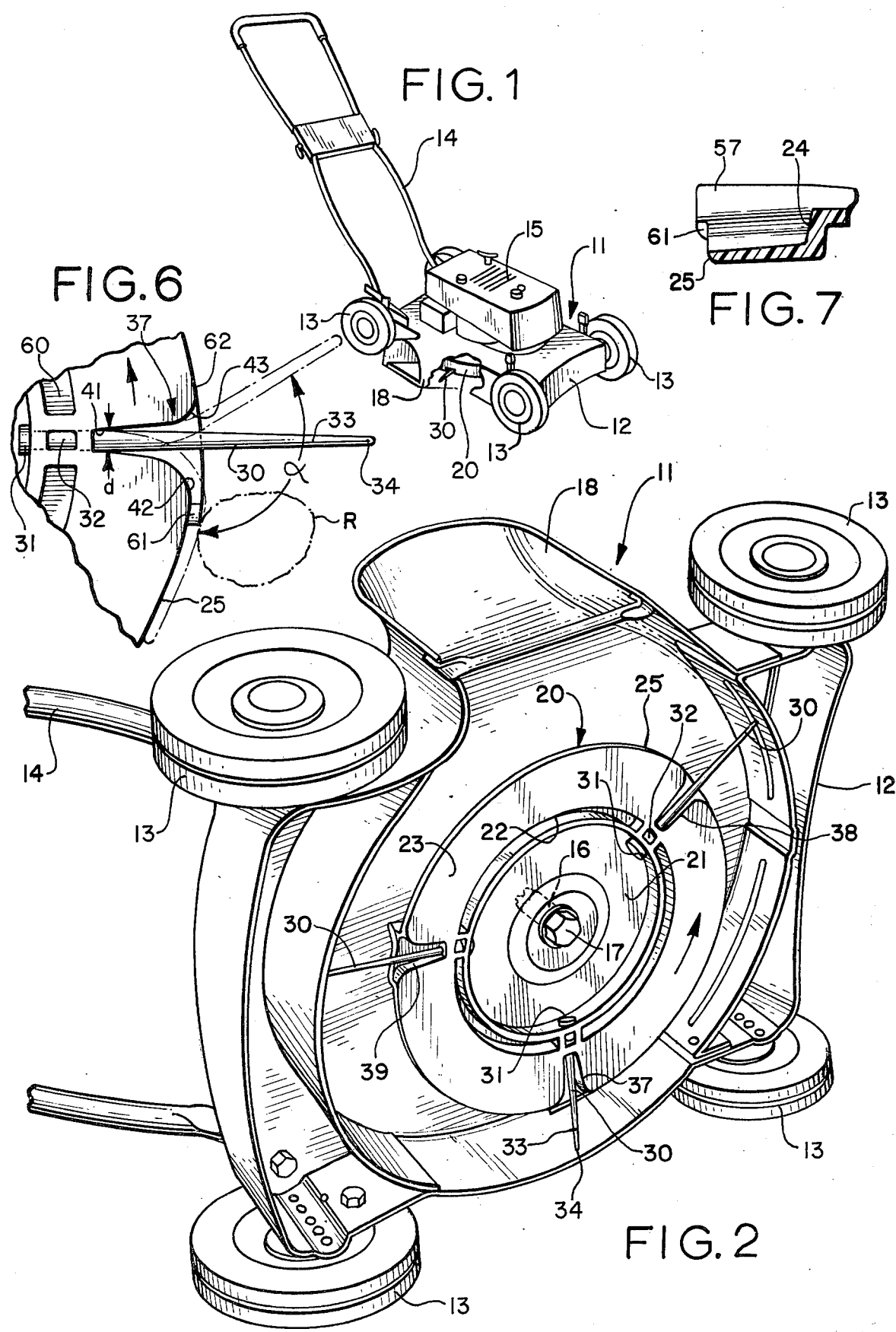

U.S. Patent  Nov. 28, 1978  Sheet 2 of 5  4,126,990
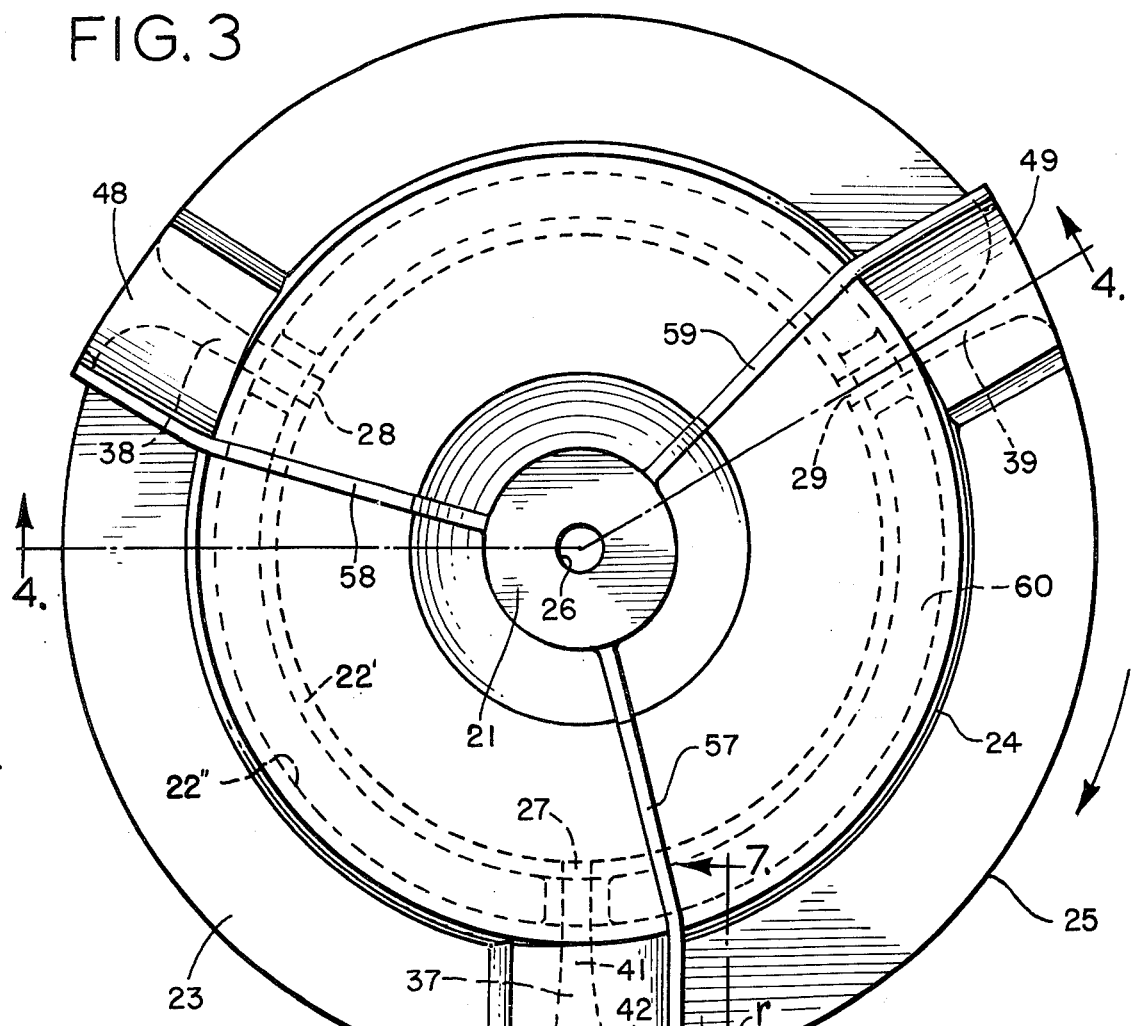
FIG. 3
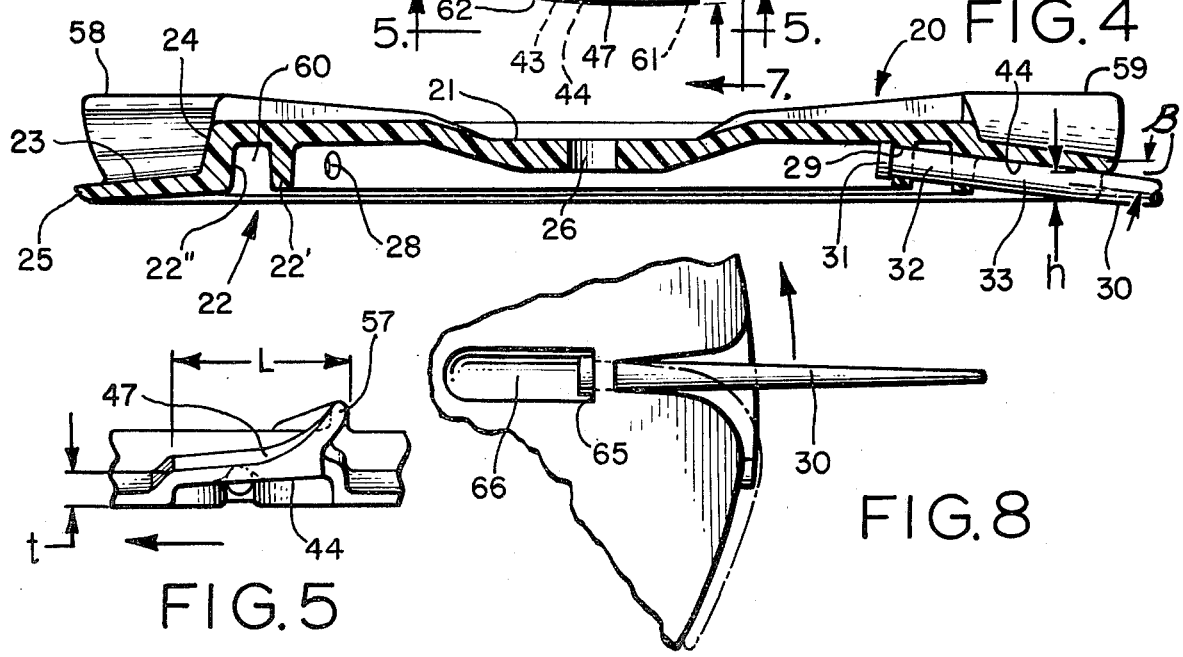
FIG. 4
FIG. 5
FIG. 8

CUTTER DISC ASSEMBLY FOR ROTARY LAWN MOWER

A safe cutter disc assembly for rotary lawn mower is disclosed in Fisher et al. application, Ser. No. 611,347 filed Sept. 8, 1975 and now abandoned and replaced by Ser. No. 766,377 which has issued as U.S. Pat. No. 4,065,913. Such assembly includes a disc formed of resiliently deformable plastic providing radially extending openings, with cutter pins registered in the openings, each cutter pin being formed of durable plastic material having a flexible tip which projects beyond the periphery of the disc into cutting engagement with the grass. A curved backstop surface behind each of the pins supports the shank of the pin for distributed bending to avoid setting up concentrated stress. It is the purpose of the present application to cover an improvement upon such construction distinguished by increased cutting efficiency and improved pin life.

Thus it is an object of the invention to provide a cutter disc assembly of the type employing a flexible plastic pin as a cutting element in which the pin is kept under greater control and more nearly in the desired plane of cut notwithstanding centrifugal force and the striking of obstructions. It is a general object to provide a cutter disc assembly in which each cutter pin is mounted and guided in its movement to produce a greater cutting efficiency both in the mowing of lawns and the cutting of weeds and light underbrush. It is a related object to provide a cutter disc assembly in which each pin is not only guided in a cutting plane but in which the lateral motion of the pin is reduced by damping action.

It is another object of the present invention to provide a cutter disc assembly in which a cutter pin is more fully protected against development of concentrated stress and against surface abrasion by reason of obstructions. More specifically, it is an object of the present invention to provide a cutter assembly in which the shank of the pin is nested in a downwardly facing groove having curved outwardly flaring rear wall against which the pin is bent upon striking an obstruction as well as a curved outwardly flaring front wall upon which the pin bends upon rebound, the effect in both cases being to distribute the bending to avoid concentrated stress which would result in eventual breakage. It is a more specific and related object to provide a disc construction in which a pin which has been backwardly bent by reason of striking an obstruction is shielded against abrasion by the obstruction, with the disc having a projecting peripheral ledge which "wipes" harmlessly by the obstruction while the bent pin is in a protected position.

It is another object of the present invention to provide a cutter disc which may be readily molded of tough durable plastic, which is of light construction employing the plastic material to best advantage, and which can be economically manufactured and installed to provide a long useful life.

It is yet another object of the invention to provide a cutter disc assembly which includes radially projecting, plastic pins and in which the pins may be easily and quickly replaced whenever renewal is necessary. It is a related object to provide a cutter disc assembly in which replaceable pins are protectively mounted in registering grooves but in which the design of the grooves is such as to prevent clogging or packing with grass clippings, dust or other debris.

It is an important and general object of the invention to provide a disc assembly for a rotary lawn mower which is effective in cutting of vegetation but which has a high degree of safety, both upon direct impact with an obstruction and in its relative freedom from throwing of stones or other missiles.

Other objects and advantages of the invention will become apparent upon reading the attached detailed description and upon reference to the drawings in which:

FIG. 1 is a perspective view of a rotary mower embodying the present invention with a portion of the housing broken away to reveal the cutter disc assembly.

FIG. 2 is a perspective view of the underside of the mower of FIG. 1.

FIG. 3 shows the top side of a cutter disc constructed in accordance with the invention.

FIG. 4 is a cross section of the cutter disc taken along the line 4—4 of FIG. 3 with a cutter pin in place.

FIG. 5 is a fragmentary elevation of the cutter disc looking along line 5—5 in FIG. 3.

FIG. 6 is a fragment showing the underside of the disc at one of the pin positions with the pin shown both in its extended and bent condition.

FIG. 7 is a fragmentary elevation looking along the line 7—7 in FIG. 3 showing the overhanging ledge providing protection for a pin in bent condition.

FIG. 8 is a view similar to FIG. 6 but showing a modified form of the invention.

Figure 9:
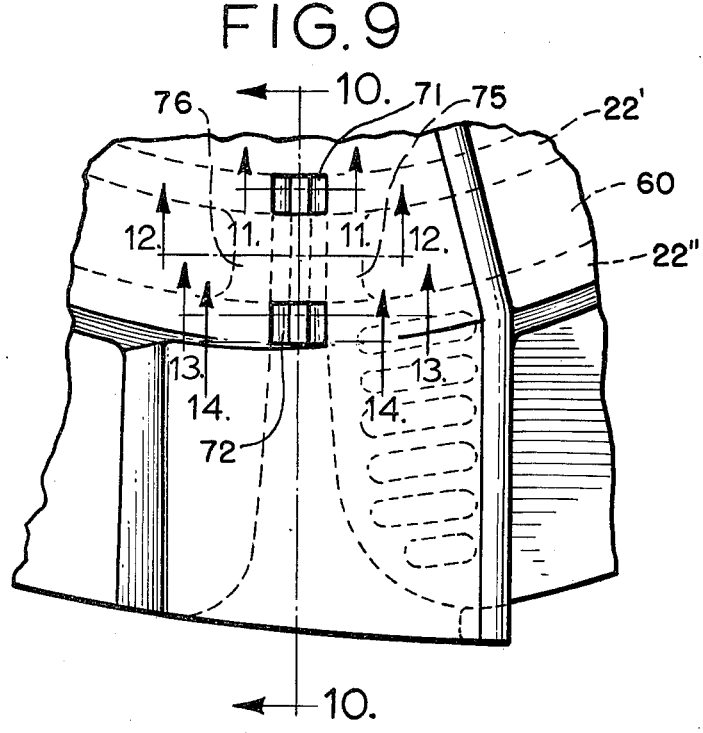
FIG. 9 is a fragmentary top view of the disc taken at one of the groove positions.

While the invention will be described in connection with certain preferred embodiments, it will be understood that we do not intend to be limited to the particular embodiments shown but intend, on the contrary, to cover the various alternative and equivalent constructions included within the spirit and scope of the appended claims.

Turning to FIGS. 1 and 2 there is shown a type of rotary mower in common use and to which the present invention is applicable. It includes a frame 11 in the form of a shallow inverted enclosure having an encircling side wall 12, a set of wheels 13, a handle 14 for propulsion and guidance, and an engine 15 which may, alternatively, be an electric motor, having a vertical drive shaft 16 which is conventionally threaded for receiving a clamping screw 17. A discharge chute 18 projects tangentially from one side of the housing to dispose of the clippings.

Secured to the drive shaft in horizontal position is a cutter disc 20 which carries the cutting elements. Such a disc, which is preferably molded of a durable and resiliently deformable plastic, has a circular central portion 21 (see also FIGS. 3 and 4), an axially offset, or wall, portion 22, and a peripheral portion 23 of relatively thin average cross section extending from a drop-off 24 and presenting an outer edge 25. Centered in the disc is a mounting hole 26 which may be optionally reinforced by a metal reinforcing disc either secured to or molded in the disc structure.

Evenly spaced openings 27, 28, 29 are provided in the wall portion 22 of the disc for receiving outwardly extending cutter pins 30. The cutter pins are formed of durable, abrasion resistant plastic, such as nylon. Each pin includes a head 31, a shank 32 and a stiffly resilient tip portion 33 terminating in an outer tip 34. The shank portion 32 is dimensioned to fit snugly, cantilever fashion, in a radial opening, for example, the opening 27. Preferably 25 to 75 percent of the length of the pin extends outboard of the disc.

In accordance with the present invention, the annular outer portion 23 is formed, on its underside, with radially extending grooves in register with the respective openings for receiving the shanks of the pins, each groove having a downwardly angled "ceiling", a narrow neck portion, and a curved, outwardly flaring rear wall against which the pin bends as the projecting tip strikes an obstruction as well as a curved outwardly flaring front wall against which the pin may bend upon rebound, thereby to support the shank of the pin with the bending distributed along the length thereof for avoidance of concentrated stress.

Referring to the drawings, the grooves are indicated at 37, 38, 39 in respective alinement with the pin receiving openings 27, 28, 29. Taking the groove 37 as representative, and referring to FIGS. 3-6, the groove has a relatively narrow neck 41 having a width $d$ which just slightly exceeds the diameter of the shank of a pin 30. The groove has a curved, outwardly flaring rear wall 42 which is of increasing curvature and which is tangentially faired into the periphery of the disc. The rear wall serves as a support or backstop for the shank of the pin as the tip portion of the pin strikes an obstruction, for example, in the form of a rock or other weighty piece of debris, R (FIG. 6), with the bending of the pin against the curved wall serving to distribute the bend smoothly in the shank of the pin so as to avoid the setting up of concentrated stress. The groove, in addition, has a front wall 43 adjacent the pin which is curved and outwardly flaring so that when the pin 30 is released, tending, because of its resilience, to rebound in the forward direction through an angle $\alpha$, the pin bends about the curved front wall 43 with the bending, again, being distributed along the length dimension of the pin for avoidance of concentrated stress. The flaring curvature and the narrowness of the throat 41 produce a groove profile which, viewed vertically, is of "trumpet" shape. Since the curvature of the rear wall 42 causes it to merge smoothly into the periphery 25 of the disc, there is no abrupt discontinuity and the outer portion of the pin is supported, in bent condition, upon the periphery.

In accordance with the present invention a substantially horizontal bridge is provided closely overlying the pin at the periphery of the disc, for the purpose of providing a ceiling surface for holding the pin in downwardly angled working position over its range of lateral motion. Thus each groove includes an inclined but substantially flat "ceiling" 44 which is preferably oriented outwardly and downwardly at a shallow angle thereby to provide a superimposed guide surface for not only holding the pin to the work but also for damping the lateral movement of the pin. The angling of the ceiling from the horizontal, indicated at $\beta$ in FIG. 4, is preferably within the range of 2° to 8°.

The projection of the tip portion of the pin below disc level tends to insure that the cut grass will not drag on the bottom surface of the disc. The ceiling of the groove, by its contact with the pin, overcomes the tendency of the pin to ride at a higher level, that is, to straighten out horizontally as a result of centrifugal force, tending to keep the tip portion of the pin at a desired cutting level in spite of variations in centrifugal force. The ceiling is preferably of such height $h$ (FIG. 4), i.e. the groove 37 has such axial depth, as to contain the shank of the pin 30 and thus shield and protect it against abrasion from the underside which occurs when the rapidly rotating disc is, during the course of mowing, brought against some sharp projection on the surface of the ground.

In accordance with one of the aspects of the present invention the ceiling surfaces 44 of the respective grooves 37, 38, 39 are formed by integral reinforcing "bridges" 47, 48, 49. Taking the groove 37, and its bridge 47, as representative, it will be seen in FIG. 5 that the bridge 47 is a region of the outer portion 23 of the disc where the disc has augmented thickness $t$. The region of augmented thickness extends circumferentially over a length L which substantially overlaps the side walls of the groove, and extends radially from the drop-off 24 to the outer edge 25 of the disc. Each bridge thus serves to reinforce the disc to make it uniformly strong.

It is a still further object of the present invention to provide upswept radial vanes which are integrally formed on the top surface of the disc and which are preferably connected at their outer ends with respective ones of the bridges. Thus, referring to FIGS. 3, 4 and 5, vanes 57, 58, 59 extend from the central portion of the disc radially outwardly at their outer ends the trailing edges of the respective bridges. The vanes are of special upwardly-swept cross section (FIG. 5) so as to create upward movement of the air in the immediate vicinity of the pins. Where the disc has no air flow openings the vanes tend to cause a partial vacuum above the disc which causes the grass to be agitated as it is being cut to increase effectiveness of cut and for efficient discharge. The vanes not only create desired air flow as the disc rotates at high speed, but also insure that the disc is reinforced in multiple directions, the bridges providing circumferential reinforcement adjacent the periphery while the connected vanes provide radial reinforcement.

Preferably the wall portion 22 of the disc is relieved by forming therein a circular groove 60 that is defined by two ribs 21', 22" (see FIG. 4) which are concentric and radially spaced from one another over most of their length with alined openings so that the shank of the pin is gripped at axially spaced regions to provide firm cantilevered support with a minimum of supporting structure. However, to practice the invention it is not necessary for the wall 22 to be continuous or for there to be a single central recess for removal and replacement of the pins. If desired, the wall portion 22, in which the pins are retained, may be discontinuous and the wall may be formed of separate segments 65 formed at one end of an individual radial recess 66 provided for each of the pins (see FIG. 8).

In accordance with a further feature of the present invention there is provided, at the point where the rear wall 42 merges with the periphery 25 of the disc, a radially projecting ledge which extends outwardly beyond the tip portion of the pin 30 when it is bent backwardly upon striking of an obstruction. Thus, referring particularly to FIGS. 3, 6 and 7 it will be noted that the bridge 47, along its trailing edge, is extended radially outward to form a ledge 61 which projects beyond the periphery 25 by an amount indicated at $r$ (FIG. 3) which approximates the thickness of the pin at the point of exit. The ledge is preferably smoothly faired with respect to the ledge of the disc at its leading edge 62 to insure that the obstruction "wipes by", or is "cammed away" from the pin so that the pin is protected from radially applied abrasion. If desired, the ledge 61 may be extended upstream and faired, also, at its trailing edge. Since the amount of material which forms the periphery of the disc is substantially greater than the amount of material used in the tip portion of the pin, the disc is well able to absorb the impact and forces of abrasion while imparting to the pin a much longer life in the face of rough usage.

It is one of the features of the present construction that the pins 30 may be readily replaced, when worn, without any necessity for demounting the disc from the drive shaft. That is to say, all of the pins 30, and particularly the heads 31 thereof, are all readily accessible for withdrawal into the central recess. To remove a pin it suffices to push inwardly on the shank or to pry under the head, until the head has been sufficiently unseated to enable the pin to be drawn radially inward, the pin bowing slightly in the process. Replacement is a simple matter of tapping a new pin in place with a light hammer or even with the side of the pliers employed in the removal.

It will be apparent that the construction which has been described amply fulfills the objects earlier set forth. Cutting action is more efficient since the pins are all maintained in their downwardly angled cutting position, that is, maintained in the preferred "cutting plane" defined by the tips of the pins, by reason of the "holddown" action of the groove ceiling 44 which is flat and which thus provides its hold-down function over the entire range of swing of a pin from a rearwardly bent position assumed while striking an obstruction to a forwardly swung, or rebound, position after the obstruction has been safely traversed. Because of the curved outwardly flaring rear and front surfaces of the groove which engage the respective sides of the pin, bending is distributed over the longitudinal dimension of the pin, and there is no point of repeated stress concentration at which breakage is likely to occur. Because of the radially extending "edges" 61 which act as a shelter for the pins, the pins have a substantially longer life. Nevertheless, when a pin must finally be replaced, replacement is simple and easy.

While the shanks of the pins are protectively enclosed in downwardly facing grooves, it is found that grooves remain free of crushed grass and other debris which might affect the freedom of the pin to bend backwardly and forwardly under stress. The reason for such freedom is believed to be the fact that each pin, in the normal operation of the mower, constantly works back and forth and the grooves, being of outwardly flaring profile, are inherently self-shedding.

In addition to holding the cutter pin 30 (FIG. 4) in a downwardly angled position, so that the cutting tends to take place below disc level, the ceiling 44 of the groove performs the function of damping the movement of the pin. High speed movies taken under actual operating conditions show that the pin 30 upon being released from an obstruction does indeed swing forwardly, due to its resilience and with a snake-like action, until it contacts the front wall 43 of the groove just as illustrated in FIG. 6. Contact between the upper surface of the pin and the ceiling 44 of the groove, particularly in the region of the periphery, is assured because of the leveling action of centrifugal force, that is, the tendency of centrifugal force to radially aline the pin with its point of attachment. The force of the pin against the ceiling is not great enough to cause aggravated wear but is great enough to produce a frictional drag which inherently inhibits oscillation of the pin through a wide angle after striking an obstruction by reason of the pin's inherent resilience. The result is to produce a more even and consistent cutting action in spite of striking of obstructions and in spite of the uneven growth of the grass being cut.

Figure 10:
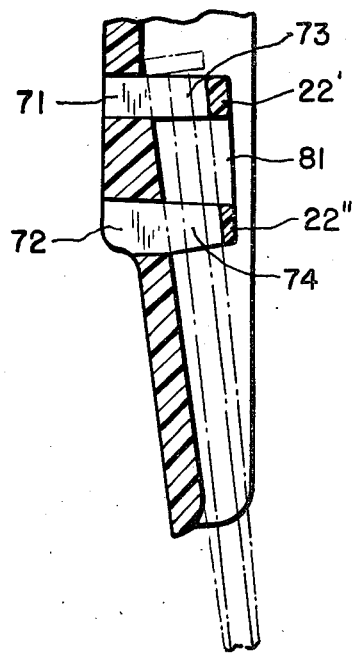
FIG. 10 is a radial section looking along line 10—10 in FIG. 9.
Figure 15:
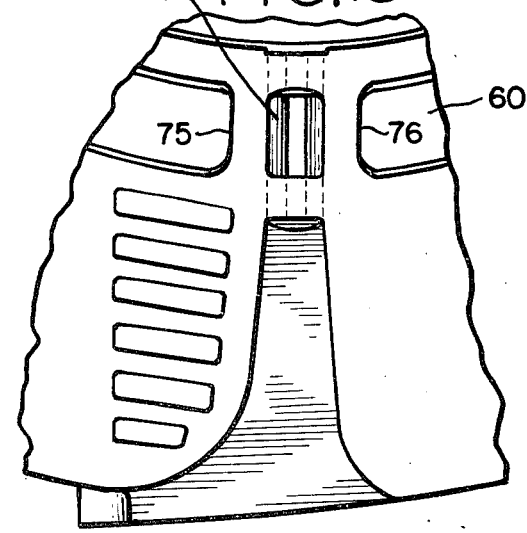
FIG. 15 shows the underside of the portion of the disc shown in FIG. 9.
Figure 11:
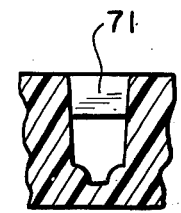
FIGS. 11-14 are a series of parallel, trans-radial sections taken on corresponding section lines in FIG. 9.
Figure 12:
Figure 13:
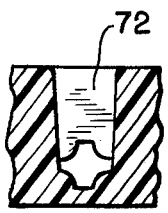

It is one of the specific features of the present invention that the wall portion 22 which has the annular groove 60 that is defined by concentric ribs 22', 22" is intersected by radially spaced recesses in the top surface of the disc and which extend downwardly to form radially alined saddle openings in the ribs. Thus referring to FIGS. 9 and 10, the disc, at each pin location, has recesses 71, 72 which penetrate downwardly into the ribs 22', 22" to form alined, pin-receiving saddle openings 73, 74. The recesses 71, 72 are shown in profile in FIGS. 11, 13. To reinforce the pin-receiving openings 73, 74, the annular groove 60 is radially "bridged" at each pin position by reinforcing walls 75, 76. In order to achieve clearance of the pin between the reinforcing walls, the underside of the groove is provided with an upwardly extending recess 81, shown in section in FIG. 12, and which axially overlaps the recesses 71, 72 to define a through-opening for the pin having the profile illustrated at 82 in FIG. 14.

Figure 14:
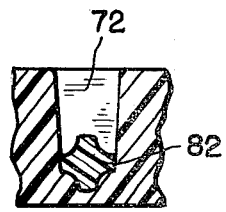
Figure 16:
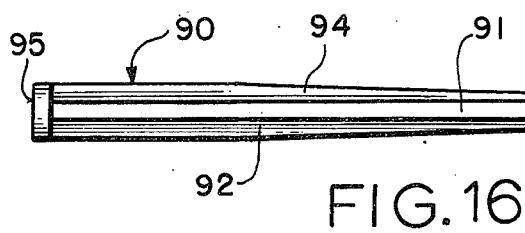
FIG. 16 shows a preferred form of pin employed with the structure shown in FIGS. 9-15.
Figure 17:
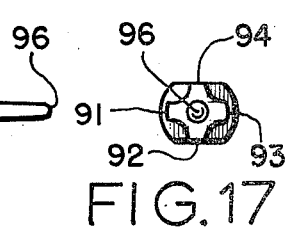
FIG. 17 is an end view of the pin of FIG. 16.

While the bottoms of the recesses 71, 72 and 81 may be circularly profiled for reception of a pin of circular cross section, it is preferred to employ a pin of non-circular cross section as indicated at 90 in FIG. 16 and 17. As here shown the pin is of fluted construction having axially extending ribs 91-94, and provided with a head 95 and terminating in a tip 96. The pin construction is more completely discussed in our co-pending application, Ser. No. 756,329 filed Jan. 3, 1977. Such a ribbed pin has a number of advantages, but it will suffice for present purposes to say that the pin shown in FIG. 16, registered in the ribbed opening 82 shown in FIG. 14, is nonrotatable in the opening so that the pin maintains a constant and predetermined orientation to provide a relatively narrow line of impact with the grass thereby to improve cutting efficiency, while being reversible through 180°. By use of alined saddle openings the pin may be positively anchored, and tightly cantilevered, using a minimum amount of material in the disc. Moreover, because of the saddle openings, the pin is gripped over only a limited amount of area, and on alternating opposite sides, so that replacement of the pin is much easier than where the pin is wedged tight in an opening which encircles the pin. Finally, access provided through the lower recess 81 permits entry of a prying tool for pin removal in those instances where the head of the pin has become damaged.

Figure 18:
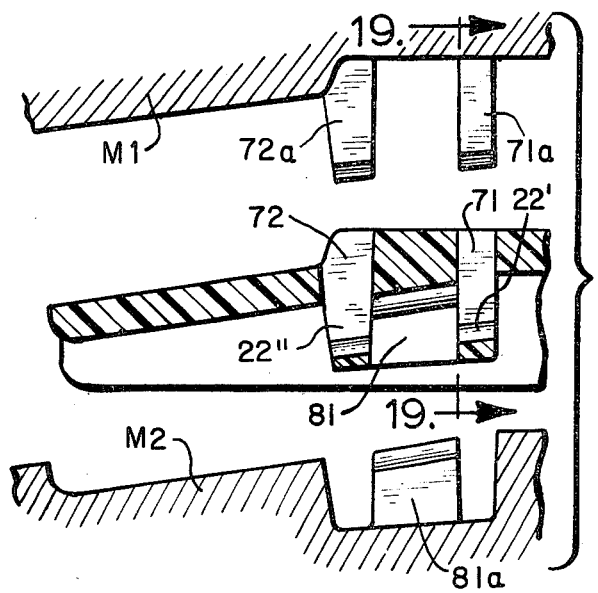
FIG. 18 is a sectional view similar to FIG. 10 and showing the cooperating dies employed to form the disc.
Figure 19:
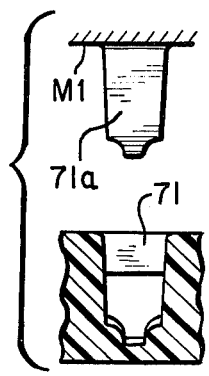
FIG. 19 is a vertical section looking along line 19—19 in FIG. 18.

The recesses 71, 72 and 81 can be readily formed in a two piece mold having mold sections M1, M2 (FIG. 18). The mold section M1 is provided with projections 71a, 72a while the lower section has a projection 81a, corresponding to the similarly numbered recesses. It is preferred that the tips of the projections be of scalloped profile to produce a cruciform opening (82 in FIG. 14) for keyed reception of the cross section of the pin, but the tips of the projections may be circularly profiled if desired.

Figure 20:
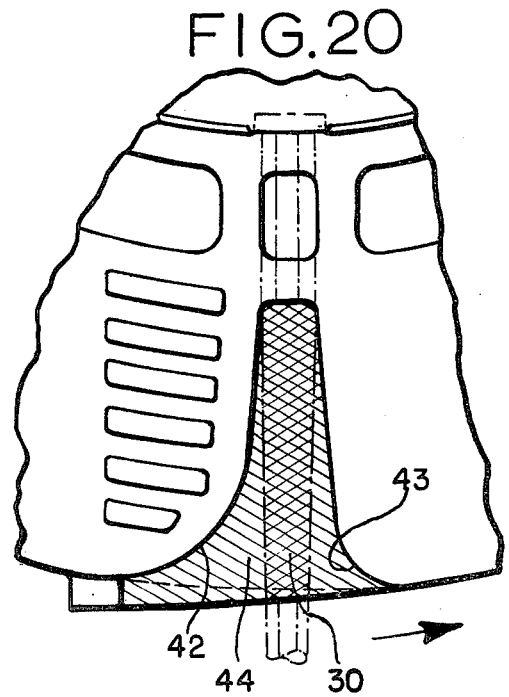
FIG. 20 is a view similar to FIG. 15 and showing the projected area relationships.

In describing the preferred form of the invention (which utilizes a notch having an outwardly flaring back wall 42 and an outwardly flaring front wall 43 to form a notch of trumpet profile with a ceiling 44 in between) no mention has been made of the total area of the ceiling. In accordance with one of the aspects of the present invention to ceiling area is limited so that it is no more than about two to three times the area of the pin projected upon the ceiling. Thus, referring to FIG. 20, where the total cross hatched area of the ceiling is indicated at 44, such area should preferably not exceed the doubly cross hatched area of the pin 30 by a factor of more than 2 to 3. The result is to produce a notch which is sufficiently wide for adequate flexing of the pin as it strikes an obstruction, and upon rebound, yet sufficiently small so that the free area is not capable of serving as a pocket or pouch for catapulting small stones and other debris.

Figure 22:
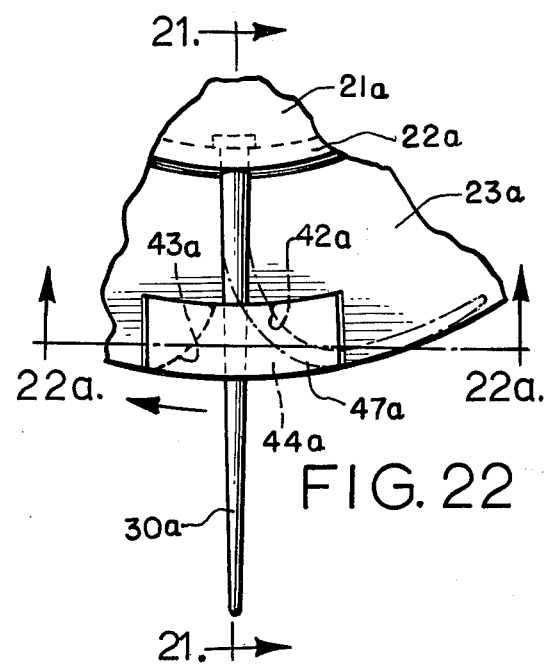
FIG. 22 is a fragmentary top view looking along the line 22—22 in FIG. 21.
Figure 21:
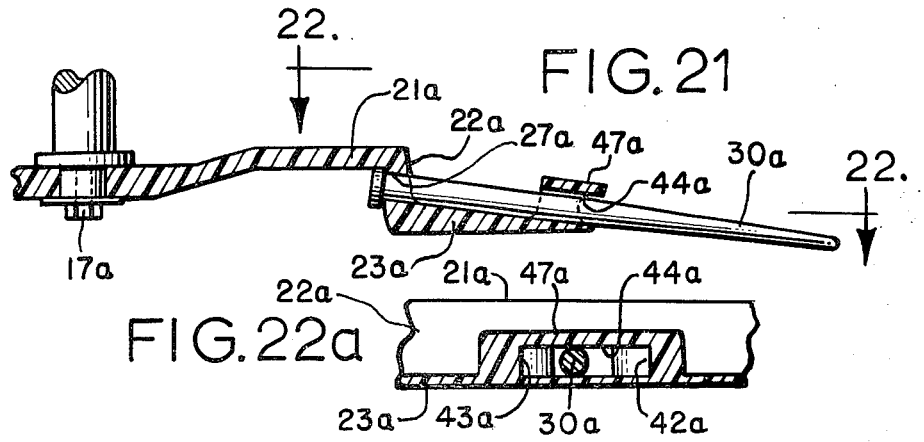
FIG. 21 is a fragmentary vertical section of a modified form of disc looking along line 21—21 in FIG. 22.
Figure 22A:
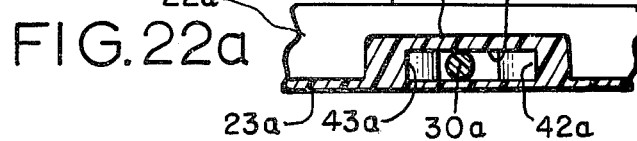
FIG. 22a is a fragmentary section looking along line 22a—22a in FIG. 22.

In the preferred form of the invention the pin is recessed, as described, in a groove formed in the underside of the peripheral portion of the disc. However, in accordance with the broader aspects of the invention it is not essential to provide a groove, and the invention may be employed in modified form as illustrated in FIGS. 21, 22 and 22a where corresponding numerals have been employed with addition of subscript "a". Thus the disc has a disc-shaped body including a central portion 21a and a peripheral portion 23a, the central portion having a rotary drive connection 17a. Means indicated at 22a are provided for anchoring the pin 30a in a radially extending opening 27a which is angled downwardly at a shallow angle, with the tip portion of the pin projecting radially beyond and below the periphery of the disc. A backstop surface 42a (FIG. 22) is arranged in the path of bending movement of the shank portion of the pin to support the pin as the projecting tip portion strikes an obstruction, and a corresponding frontstop surface 43a, preferably curved, is placed in the path of forward movement of the pin to support it upon rebound. A bridge, indicated at 47a, closely overlies the pin at the periphery of the disc. The bridge serves to hold the pin in a downwardly-angled working position notwithstanding the elevating effect of the centrifugal force, while producing a dampening effect upon the pin by reason of frictional engagement with the ceiling surface 44a as the pin bends backwardly and forwardly below the bridge.

Figure 23:
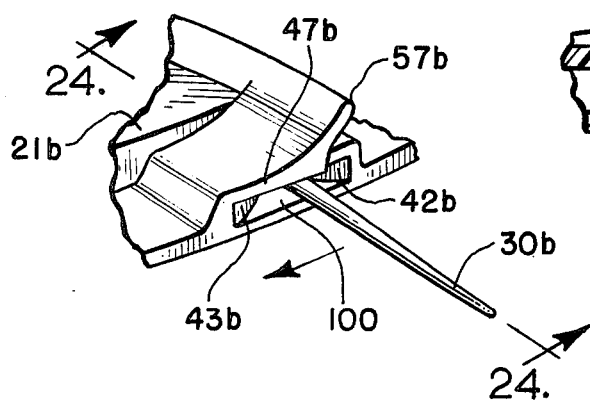
FIG. 23 is a fragmentary perspective of a further modification of the invention.
Figure 24:
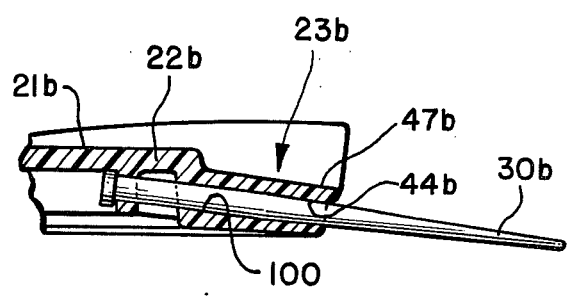
FIG. 24 is a vertical section looking along line 24—24 in FIG. 23.

It is further within the scope of the present invention to provide the groove 41 of the preferred embodiment, and in which the pin is recessed, with a "floor" thereby enclosing the groove on the underside. Such structure is illustrated in FIGS. 23 and 24, in which the "floor" surface is indicated at 100 opposed to the ceiling surface 44b, and with all other corresponding elements being designated by corresponding reference numerals with addition of subscript "b". By enclosing the groove on the underside, the groove is converted into a radially extending recess, completely enclosing the pin, while permitting swinging movement thereof between a backstop surface 42b and a front wall 43b. The floor not only prevents entry of small stones which conceivably could become missiles, but it also provides additional frictional damping for the pin, while preventing the shank portion of the pin from moving downwardly beyond the undersurface of the disc. In short, the floor insures that the pin is at all times contained and fully protected in all directions. Finally, it will be understood that the integral floor 100 serves to further strengthen the disc structure. If desired, the floor may be extended radially outward to provide a lower protective ledge having the same profile as the ledge 61 (FIG. 3).

Figure 25:
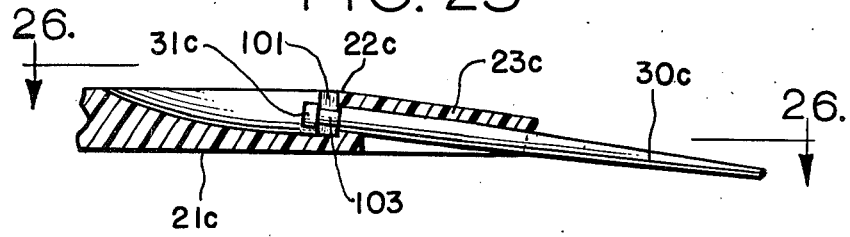
FIG. 25 is a vertical fragmentary section of a still further modification of disc looking line 25—25 in FIG. 26.
Figure 26:
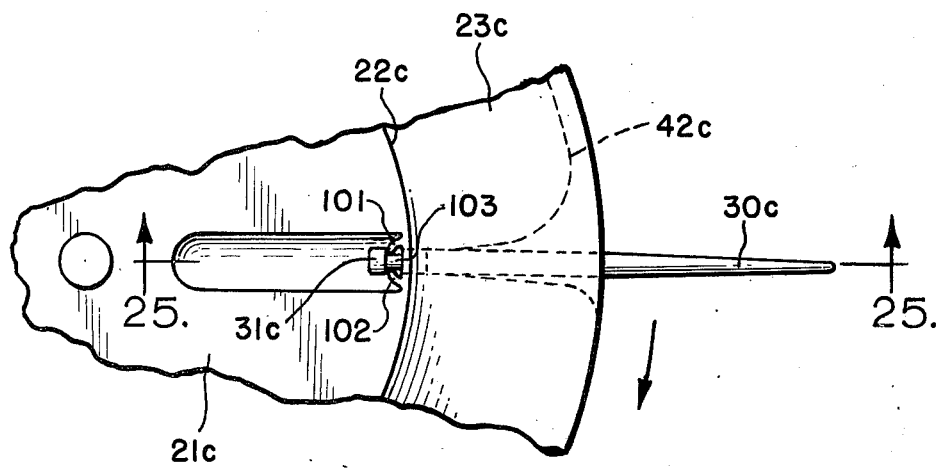
FIG. 26 is a fragmentary top view looking along the line 26—26 in FIG. 25.

In the various embodiments of the invention described above, the pin has an enlarged head and is intended to be inserted "from the inside out". In accordance with one of the aspects of the present invention provision is made for inserting a pin "from the outside in" by avoiding an enlarged head and by providing latching members, for example, in the disc structure. Such a modified embodiment is shown in FIGS. 25 and 26, in which corresponding reference numerals, with addition of subscript "c", are employed to indicate corresponding parts. In this embodiment the head 31c of the pin has the same diameter as the shank. The pin is engaged and retained by a pair of resilient latch members 101, 102 which may either be separate or integrally formed when molding the disc and which are oriented in inwardly-sprung positions engaging a reduced section 103 of the pin immediately under the head 31c.

Upon insertion head first, when the head strikes the latch members 101, 102 they are cammed outwardly and then snap into the reduced section 103 to hold the pin firmly in place against the effects of centrifugal force. When pin replacement is necessary, the old pin may be squarely severed at the periphery of the disc and tapped inwardly by means of a drift pin or the like, thereby freeing the opening for insertion of a new pin. This may be accomplished without having access to the top of the disc so that the disc need not be removed from the mower for pin replacement.

An additional feature, shown in FIG. 26, is the use of a fully extended backstop 42c spaced inwardly from the edge of the disc and against which the entire shank and tip portions of the pin 130c can smoothly bend, with the tip portion being received within the periphery of the disc. In other words the backstop forms a recess in the edge which accommodates the entire backswept pin. An advantage of this, in addition to nested protection of the pin, is that the profile of the disc is perfectly circular, further minimizing the possibility of missile projection. The other features and advantages provided by the structures shown in FIGS. 23-26 are equivalent to the features and advantages of the preferred embodiment.

The term "stiffly resilient" has been used to characterize the tip portion of the cutter pin. This term has been used in order to distinguish over rigid and relatively non-yielding, or backed-up, cutting elements which have been used in the prior art and which are capable of inflicting serious injury upon the hand or foot of the operator. The term is also used to distinguish over filamentary cutting elements, for example formed of nylon, which are relatively limp, which tend to sag under their own weight, and which require centrifugal force to keep them extended and in cutting engagement with the grass or weeds. The present cutter pin does not sag under its own weight or rely upon centrifugal force to keep it in a cutting posture. Indeed, the pin is stiff enough so that the tip remains downwardly angled, to cut at or slightly below disc level in spite of the elevating, or leveling, effect of centrifugal force. It is nevertheless of sufficiently low mass, and sufficiently resilient and yielding so as to retreat to an out-of-the-way position upon striking an obstruction including the hand or foot of the operator. While the tip is capable of applying a painful blow to an exposed limb, severe injury of the type inflicted by a steel blade is avoided.

The disc itself, while light in weight, is inherently strong and durable, self-reinforced by the integral bridges which overlie the notches and by the radial vanes. The disc is of such shape as to permit it to be readily molded, using nylon, delrin, or similar high impact, abrasion resistant plastic materials.

While it is preferred to employ pins molded of resilient abrasion resistant plastics and having enlarged heads, it has been pointed out that an enlarged head is not essential to practicing the invention and that the term "head" simply refers to the inner end of the pin which is secured against radial dislodgement. The term "evenly spaced" as applied to the pins simply means spacing which is sufficiently symmetrical as not to result in unbalance. The term "plastic" includes tough flexible materials having a density characteristic of synthetic plastics in general, exhibiting abrasion resistance equivalent to the high performance synthetic materials already mentioned and capable of self-restoration to substantially radial position after bending at right angles around a curved backstop.

What is claimed is:

1. A cutter disc assembly for a rotary lawn mower comprising, in combination, a disc-shaped body including a circular central portion and a peripheral portion, the central portion having a rotary drive connection, pin anchoring means adjacent the junction between the central portion and the peripheral portion providing a radially extending opening angled downwardly at a shallow angle, a cutter pin formed of durable plastic having a head and a shank and terminating in a stiffly resilient tip portion, the pin being mounted cantilever fashion downwardly angled in the opening with the head adjacent thereto so that the tip portion projects radially beyond and below the periphery of the disc, a backstop on the peripheral portion of the disc arranged in the path of bending movement of the shank portion of the pin and against which the pin bends as the projecting tip portion of the pin strikes an obstruction thereby to reduce concentration of stress in the shank portion of the pin, and a substantially horizontal bridge closely overlying the pin at the periphery of the disc for the purpose of holding the pin in downwardly angled working position notwithstanding the elevating effect of centrifugal force and for providing frictional damping as the pin bends back and forth below the bridge.

2. The combination as claimed in claim 1 in which the tip portion of the pin is of smoothly tapering section so that when the pin strikes an obstruction the tip portion of the pin which extends beyond the backstop bends with distributed curvature and substantially free of concentrated stress.

3. The combination as claimed in claim 1 in which from 25 to 75 percent of the length of the pin projects radially beyond the periphery of the disc.

4. The combination as claimed in claim 1 in which the radially extending opening has a non-circular profile and in which the shank of the pin is of registering non-circular profile so that the pin is restrained against twisting about its axis during the course of rotation of the disc.

5. A cutter disc assembly for a rotary lawn mower comprising, in combination, a disc formed of resiliently deformable plastic having a circular central portion and a peripheral portion surrounding the same, the disc having pin anchoring means adjacent the junction between the central portion and the peripheral portion providing a radially-extending opening, the peripheral portion having a radially extending groove formed on the underside in register with the opening, a cutter pin formed of durable plastic having a head and a shank and terminating in a stiffly resilient tip portion, the cutter pin being mounted in the opening with the shank in the groove and with the tip portion thereof projecting radially outwardly from the periphery of the disc for cutting of grass as the disc is rotated, the groove having sufficient axial depth to shield and protect the shank of the pin, the groove having a curved rear wall of outwardly flaring shape against which the pin bends as the projecting tip portion of the pin strikes an obstruction, and the groove further having a curved front wall of outwardly flaring shape against which the pin may rebound so that the shank of the pin is supported in each direction with the bending being distributed along the length of the shank for avoidance of concentrated stress in the pin, the groove having a substantially flat ceiling extending downwardly at a shallow angle to orient the pin in a position in which the tip portion thereof extends outwardly beyond and below the disc.

6. The combination as claimed in claim 5 in which there is provided at the point where the rear wall merges with the periphery of the disc an overhanging ledge which overlies the pin as it is bent backwardly upon striking of an obstruction thereby to protect the side of the pin from abrasion by the obstruction, the ledge merging at its forward end with the periphery of the disc to facilitate the disc's "wiping by" the obstruction.

7. The combination as claimed in claim 5 in which the disc has a wall portion between the central portion and the peripheral portion and in which the wall portion has an annular groove formed therein to define two ribs concentric with and radially spaced from one another and with radially alined openings so that the shank of the pin is gripped adjacent the head at regions spaced radially of the disc to provide firm cantilevered support.

8. The combination as claimed in claim 5 in which the area of the ceiling is no more than about three times the area of the pin projected on the ceiling.

9. A cutter disc assembly for a rotary lawn mower comprising, in combination, a disc having a circular central portion and a peripheral portion, the peripheral portion of the disc having a plurality of radial grooves evenly spaced on the underside, cutter pins in the respective grooves, means at the inner ends of the grooves for gripping the pins adjacent the head for retaining them in the grooves, the cutter pins being formed of durable plastic, each pin having a head and a shank terminating in stiffly resilient tip portion, the grooves having a ceiling angled downwardly at a shallow angle so that the tip portion of the pin projects radially outwardly and downwardly from the periphery of the disc for cutting of grass as the disc is rotated, the grooves being sufficiently deep to shield and protect the pins, each groove having a relatively narrow neck and including a curved rear wall of outwardly flaring shape against which the pin bends as the projecting tip of the pin strikes an obstruction and a front wall against which the pin may bend upon rebound thereby to support the shank of the pin for bending in each direction with the bending stress being longitudinally distributed.

10. A cutter disc assembly for a rotary lawn mower comprising, in combination, a disc having a circular central portion and a peripheral portion surrounding the same, the disc having a shallow cylindrical wall at the junction between the central portion and the peripheral portion, the wall having formed therein a plurality of radially extending openings evenly spaced therein, the peripheral portion having radially extending grooves registered with the openings, cutter pins registered in the openings and occupying the grooves, the cutter pins being formed of durable plastic, each pin having a head and a shank terminating in a stiffly resilient tip portion, with the tip portion of the pin projecting radially outward from the periphery of the disc for cutting of grass as the disc is rotated, the grooves being sufficiently deep to shield and protect the pins, each groove having a narrow root portion substantially corresponding to the diameter of the shank of the pin and having a curved rear wall of outwardly flaring shape against which the pin bends as the projecting tip of the pin strikes an obstruction as well as a curved outwardly flaring front wall against which the shank of the pin may bend upon rebound, the peripheral portion of the disc having on the top surface thereof integral bridges overlying the respective grooves with the bridges providing superimposed downwardly angled guide surfaces for the respective pins to hold each pin in a downwardly angled working position.

11. The combination as claimed in claim 10 in which at least the trailing edge of each bridge projects slightly beyond the periphery of the outer portion to form a ledge for shielding the tip portion of the pin when the tip portion bends inwardly upon striking an obstruction.

12. The combination as claimed in claim 10 in which radial vanes are provided at the top of the disc being connected at their outer ends with respective ones of the bridges.

13. The combination as claimed in claim 10 in which the bridges are extended outwardly of the periphery of the disc to provide ledges which overlie the respective pins in the bent condition, the ledges being faired with the periphery of the disc along their forward edges.

14. A cutter disc assembly for a rotary lawn mower comprising, in combination, a disc having a circular central portion and a peripheral portion surrounding the same, the disc having a wall portion at the junction between the central portion and the peripheral portion, the wall portion providing a plurality of radially extending openings evenly spaced therein, the peripheral portion having on its underside radially extending grooves in register with the respective openings, cutter pins mounted in the openings, the cutter pins being formed of durable plastic, each pin having a head and a shank terminating in a stiffly resilient tip portion, the shanks being arranged in respective grooves with the flexible tip portion projecting radially outwardly from the periphery of the disc for cutting of grass as the disc is rotated, the grooves being sufficiently deep to fully accommodate the pins, the grooves each having a trumpet profile with a narrow neck and defining a rear wall against which the pin bends as the projecting tip of the pin strikes an obstruction and a front wall against which the pin may bend upon rebound thereby to support the shank of the pin with the bending thereof distributed longitudinally for avoidance of concentrated stress in the pin.

15. A cutter disc assembly for a rotary lawn mower comprising, in combination, a disc having a circular central portion and a peripheral portion, the peripheral portion of the disc having a plurality of radial grooves evenly spaced on the underside, cutter pins in the respective grooves, the cutter pins being formed of durable plastic, each pin having a head and a shank terminating in a stiffly resilient tip portion with the tip portion projecting radially outwardly from the periphery of the disc for cutting of grass as the disc is rotated, the grooves being sufficiently deep to shield and protect the pins, each groove having a relatively narrow neck and including a curved rear wall of outwardly flaring shape against which the pin bends backwardly as the projecting tip of the pin strikes an obstruction, thereby to support the shank of the pin with the bending being distributed along the length thereof for avoidance of concentrated stress in the pin, each groove including an inclined substantially flat ceiling which is oriented downwardly at a shallow angle thereby to provide a superimposed guide surface for the contained pin tending to hold the pin in a downwardly angled working position in which the tip portion of the pin extends below disc level notwithstanding the action of centrifugal force upon the pin.

16. The combination as claimed in claim 15 in which radial vanes are provided on the top of the disc, the vanes extending from the central portion of the disc substantially to the periphery, the vanes being of upswept profile.

17. The combination as claimed in claim 15 in which the pin is of tapering construction, being of substantially greater diameter at the shank portion than at the tip portion.

18. The combination as claimed in claim 15 in which the curved rear wall merges smoothly with the periphery so that when the pin is bent rearwardly upon striking of an obstruction the tip portion is smoothly wrapped about the periphery of the disc, the edge of the disc being extended outwardly beyond the groove a short distance to provide a narrow ledge which overhangs the bent pin to protect the same from abrasion by the obstruction, the underside of the ledge being flush with the ceiling of the groove and forming a smooth continuation of the latter.

19. As an article of manufacture a plastic cutter disc assembly for a rotary mower comprising a disc-shaped body including a central portion and a peripheral portion surrounding the same, the central portion having a rotary drive connection and the peripheral portion having an undersurface forming a ceiling which slopes downwardly at a shallow angle, a pair of downwardly extending radially-spaced annular reinforcing ribs at the junction between the central portion and the peripheral portion, means defining a pair of radially alined recesses in the top surface of the disc extending downwardly into the respective ribs and intersecting the same to form a pair of alined radially-extending saddle openings in the ribs, a plastic pin having a head, a shank and a stiffly resilient tip portion, the pin being inserted in the alined saddle openings for cantilevered support therein, with the shank of the pin closely adjacent the ceiling and so that the resilient tip portion extends radially beyond the periphery of the disc, the undersurface of the disc providing a curved backstop in the path of bending movement of the pin for supporting the pin to distribute bending stress therein when the tip portion of the pin strikes an obstruction, the saddle openings having a predetermined non-circular profile and the cross section of the shank of the pin having a registering non-circular profile so that the pin is restrained against twisting about its axis during the course of rotation of the disc.

20. An an article of manufacture, a plastic cutter disc assembly for a rotary mower comprising a disc-shaped body including a circular central portion and a peripheral portion surrounding the same, the central portion having a rotary drive connection and the peripheral portion having an undersurface forming a ceiling which slopes outwardly and downwardly at a shallow angle, a dependent annular reinforcing rib adjacent the junction between the central portion and the peripheral portion, a recess in the top surface of the disc extending downwardly into the rib and intersecting the same to define a radially extending saddle opening in the rib, a plastic pin having a head, a shank and a stiffly resilient tip portion, the pin being inserted in the saddle opening with the shank of the pin positioned closely adjacent and parallel to the ceiling so that the tip portion extends radially beyond the periphery of the disc, the peripheral portion of the disc presenting a curved rear wall in the path of movement of the pin and against which the pin bends as the projecting tip of the pin strikes an obstruction as well as a front wall for supporting the pin upon rebound.

21. As an article of manufacture, a plastic cutter disc assembly for a rotary mower comprising a disc-shaped body including a central portion and a peripheral portion surrounding the same, the central portion having a rotary drive connection and the peripheral portion having an undersurface forming a ceiling which slopes downwardly at a shallow angle, downwardly extending annular reinforcing rib structure at the junction between the central portion and the peripheral portion, the top surface of the disc being penetrated by first and second radially alined recesses extending downwardly into the rib structure and intersecting the surfaces thereof, the undersurface of the disc being penetrated by a third recess extending upwardly into the rib structure between the first two recesses and axially overlapping the same to form alined radially-extending saddle openings in the rib structure, a plastic pin having a head, a shank and a stiffly resilient tip portion, the pin being inserted in the alined saddle openings for cantilevered support therein, with the shank of the pin closely adjacent the ceiling and so that the resilient tip portion extends radially beyond the periphery of the disc, the undersurface of the disc providing a curved backstop in the path of bending movement of the pin for supporting the pin to distribute bending stress therein when the tip portion of the pin strikes an obstruction.

22. A disc assembly for a rotary mower comprising a disc-shaped body including a central portion and a relatively thin peripheral portion, the central portion having a rotary drive connection and the peripheral portion having an undersurface forming a ceiling which slopes downwardly at a shallow angle, a depending wall extending below ceiling level at the junction between the central portion and the peripheral portion, a radial through-opening in the wall substantially flush with the ceiling, a plastic pin having a relatively rigid shank dimensioned to fit in the through-opening and having a stiffly resilient portion, the pin being inserted into the opening shank-first for cantilevered support therein with the pin lying closely adjacent the ceiling and so that the flexible tip portion extends radially beyond the periphery of the disc, the undersurface of the disc having a curved backstop adjacent the ceiling and in the path of bending movement of the pin for supporting the pin to distribute bending stress therein when the tip portion of the pin strikes an obstruction, and means on the disc for latchingly engaging the shank of the pin as it is inserted into the opening for radial retention thereof.

23. As an article of manufacture, a plastic cutter disc assembly for a rotary mower comprising a disc-shaped body including a circular central portion and a peripheral portion, the central portion having a rotary drive connection and the peripheral portion formed with a radially extending recess of trumpet shape defined by a curved front wall, a curved back wall, a ceiling, and a floor substantially parallel thereto, the ceiling sloping downwardly at a shallow angle, pin anchoring means at the junction between the central portion and the peripheral portion having a radially-extending opening substantially flush with the ceiling, a plastic pin having a head, a shank and a long flexible tip portion, the pin being inserted in the radially extending opening with the shank of the pin positioned between the walls of the recess and angled downwardly at a shallow angle closely adjacent the ceiling of the recess, the walls of the recess being curved and extending to the periphery for progressive support of the pin in the course of its bending movement as the pin strikes an obstruction and in the course of its forward movement upon rebound therefrom.

24. As an article of manufacture, a cutter support disc for use with a cutter pin having a head, a shank and a stiffly resilient tip portion and for mounting in a rotary mower, said disc comprising: a disc-shaped body including a central portion and a peripheral portion, the central portion having a rotary drive connection, cantilever pin anchoring means on the disc spaced radially inward a substantial distance from the outer periphery of the disc for cantilever mounting of the cutter pin in a radially extending position for retention thereof during rotation of the disc, and a bridge extending along the periphery of the disc closely overlying the pin to inhibit upward movement of the pin while permitting lateral bending movement thereof as the pin strikes an obstruction so that the bridge tends to hold the pin downwardly in a cutting position notwithstanding any elevating forces imposed on the pin during rotation and for providing frictional dampening of the pin as the pin bends back and forth below the bridge.

25. A cutter disc assembly for a rotary lawn mower, the assembly comprising, a disc having a central portion and a peripheral portion, the center portion having a rotary drive connection, and a cutter pin having a head and a stiff shank and terminating in a stiffly resilient tip portion, the pin being anchored to the disc cantilever fashion radially inwardly from the outer periphery of the disc so that the tip portion of the pin projects radially beyond the outer periphery of the disc, a bridge adjacent the outer periphery of the disc, the lower surface of the bridge closely overlying the pin adjacent the periphery of the disc so that the bridge maintains the pin oriented in cutting position notwithstanding any elevating forces imposed on the pin during rotation and for providing frictional dampening of the pin as the pin bends back and forth below the bridge.

26. The assembly claimed in claim 25 wherein the disc includes a ledge at the outer periphery of the disc, the ledge being integral with the disc and projecting radially outwardly further than the portion of disc periphery immediately following the ledge to form a shallow step at the edge of the disc, the ledge extending angularly behind the normal position of the pin for protecting the pin when the latter is in fully bent position.

27. A safe cutter disc assembly for a rotary lawn mower having a vertical drive shaft comprising, in combination, a disc having a central portion with provision for connection to the lower end of the drive shaft and a peripheral portion presenting a generally flat surface on its underside, at least one cutter pin on said disc arranged generally radially thereon, each pin being made of tough, resilient abrasion-resistant plastic and having a head and a stiff shank and terminating in a stiffly resilient tip portion, mounting means on the disc for engaging and supporting the shank of each pin cantilever-fashion adjacent the head so that only the tip portion of the pin projects radially outwardly of the periphery for cutting of the grass as the disc is rotated, the mounting means being spaced sufficiently inwardly of the periphery so that as the pin strikes a major obstruction radially of the disc the pin may bend relatively harmlessly about its mounting means into an inwardly bent position in which the pin is increasingly shielded by the disc, means for causing curvature to be smoothly distributed in the shank with avoidance of any sharply concentrated stress in the pin as the tip portion of the pin strikes the obstruction, substantially the entire shank of the pin being spaced upwardly from the underside of the peripheral portion of the disc and generally parallel thereto so that the shank of the pin is shielded against obstructions axially engaging the underside of the disc, and a bridge above the pin adjacent the periphery of the disc, the bridge having a generally horizontal ceiling surface spaced closely to the shank of the pin and which extends peripherally permitting lateral swinging movement of the pin while inhibiting upward movement of the pin and thus holding the tip portion of the pin down to the work as the disc rotates, the mounting means and celing surface being so oriented that the pin extends downwardly at a shallow angle so that the tip of the pin tends to be held at a level below the level of the disc.

28. A safe cutter disc assembly for a rotary lawn mower having a vertical drive shaft comprising, in combination, a disc having a central portion with provision for connection to the lower end of the drive shaft and a peripheral portion presenting a generally flat surface on its underside, at least one cutter pin on said disc arranged generally radially thereon, each pin being made of tough, resilient abrasion-resistant plastic and having a head and a stiff shank and terminating in a stiffly resilient tip portion, mounting means on the disc for engaging and supporting the shank of each pin cantilever-fashion adjacent the head so that only the tip portion of the pin projects radially outwardly of the periphery for cutting of the grass as the disc is rotated, the mounting means being spaced sufficiently inwardly of the periphery so that as the pin strikes a major obstruction radially of the disc the pin may bend relatively harmlessly about its mounting means into an inwardly bent position in which the pin is incresingly shielded by the disc, a backstop and a frontstop on the peripheral portion of the disc and arranged in the path of backward and forward bending movement of the pin, so that the curvature is smoothly distributed in the shank with avoidance of any sharply concentrated stress in the pin as the tip portion of the pin strikes the obstruction, substantially the entire shank of the pin being spaced upwardly from the underside of the peripheral portion of the disc and generally parallel thereto so that the shank of the pin is substantially shielded against obstructions axially engaging the underside of the disc, and means including a hold-down surface on the peripheral portion of the disc and generally parallel to the underside of the disc for engaging the pin for inhibiting upward movement thereof and thus tending to hold the tip portion of the pin down to the work as the disc rotates while permitting lateral swinging movement of the pin.

29. A safe cutter disc assembly for rotary lawn mower having a vertical drive shaft comprising, in combination, a disc having a central portion with provision for connection to the lower end of the drive shaft and a peripheral portion presenting a generally flat surface on its underside, the underside of the disc having at least one radial groove, a cutter pin mounted in the groove, the pin being made of tough, resilient abrasion-resistant plastic having a head and a stiff shank and terminating in a stiffly resilient tip portion, the groove having a ceiling angled downwardly at a shallow angle so that the tip portion of the pin projects radially outwardly and downwardly from the periphery of the disc for cutting of grass as the disc is rotated, the groove being sufficiently deep to shield and protect the pin, the groove having a relatively narrow neck and including a smoothly curved rear wall of outwardly flaring shape against which the pin bends upon moving rearwardly as the projecting tip portion of the pin strikes an obstruction, the rear wall of the groove being extended to provide a tip-receiving recess which is spaced inwardly from the periphery of the disc so that the shank portion and the tip portion are both supported substantially full length with smooth curvature and with the tip portion seated in the recess for protection against abrasion by the obstruction, the groove having a front wall against which the pin may bend upon rebound, the front wall also being smoothly curved for avoidance of concentrated bending stress in the pin.

* * * * *